United States Patent
Kato et al.

(10) Patent No.: US 7,053,825 B2
(45) Date of Patent: May 30, 2006

(54) COMMUNICATION DEVICE

(75) Inventors: Reiji Kato, Kanagawa (JP); Takayasu Muto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/036,316

(22) Filed: Jan. 13, 2005

(65) Prior Publication Data
US 2006/0055597 A1 Mar. 16, 2006

(30) Foreign Application Priority Data
Jan. 14, 2004 (JP) .............................. 2004-007223

(51) Int. Cl.
*H04B 7/185* (2006.01)
(52) U.S. Cl. .............................. 342/357.12; 342/357.13
(58) Field of Classification Search .......... 342/357.06, 342/357.12, 357.13; 701/207, 213, 215
See application file for complete search history.

(56) References Cited

U.S. PATENT DOCUMENTS

| | | | |
|---|---|---|---|
| 6,480,145 B1* | 11/2002 | Hasegawa | 342/357.06 |
| 6,509,870 B1* | 1/2003 | Matsushita et al. | 342/357.15 |
| 2003/0083814 A1* | 5/2003 | Gronemeyer | 701/213 |
| 2003/0231704 A1* | 12/2003 | Tanaka et al. | 375/150 |

* cited by examiner

*Primary Examiner*—Dao Phan
(74) *Attorney, Agent, or Firm*—Frommer Lawrence & Haug LLP; William S. Frommer; Thomas F. Presson

(57) ABSTRACT

A communication device able to realize a positioning computation at the high speed and able to reduce electric power consumption, wherein a host CPU obtains the error value of the reference frequency of a crystal oscillator from a GPS receiver, stores that in a storage unit, transmits this value to the GPS receiver as the next positioning computation to correct the reference frequency, and makes to search a GPS satellite, therefore the electric power need not to be supplied to the GPS receiver and the crystal oscillator, and the position-finding result can be obtained at the high speed and with reducing the electric power consumption.

7 Claims, 19 Drawing Sheets

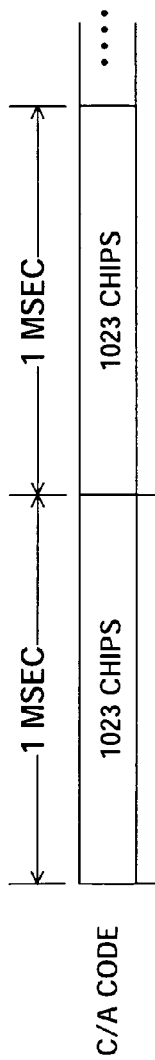
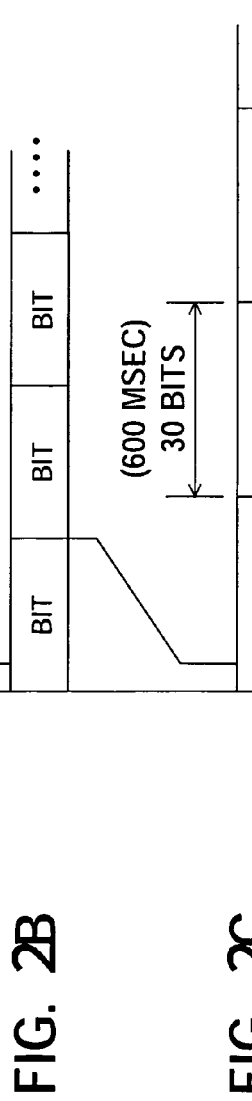
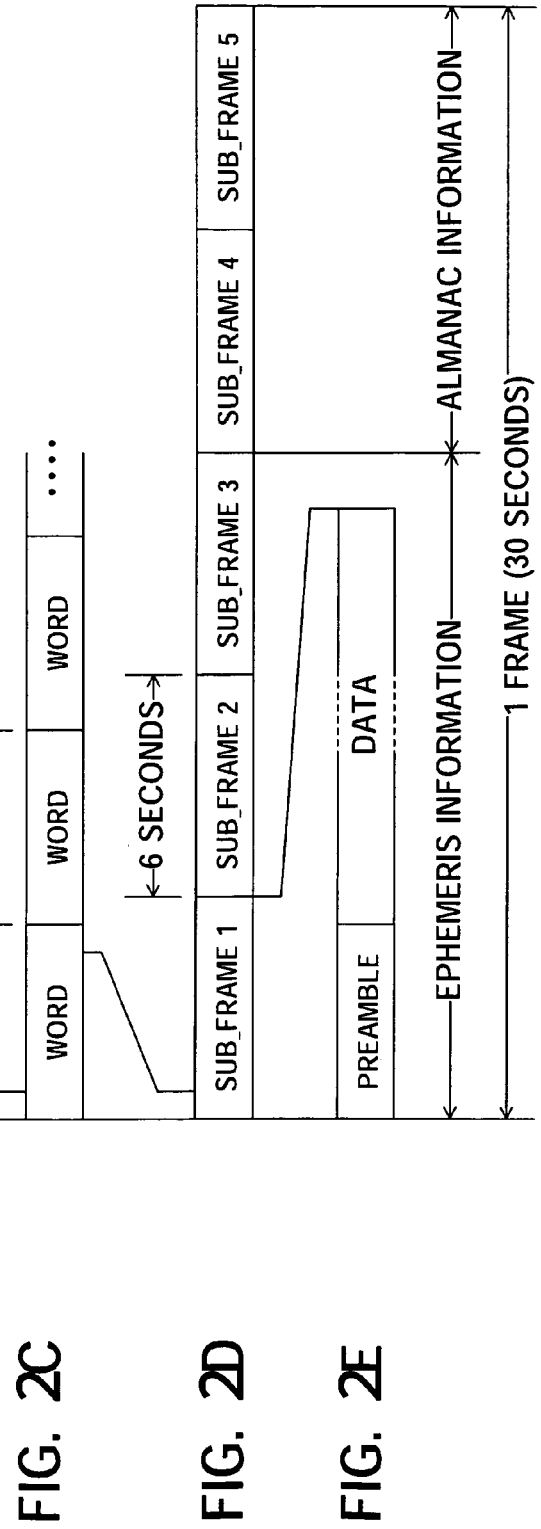
FIG. 2A
FIG. 2B
FIG. 2C
FIG. 2D
FIG. 2E

EXPLANATION OF FREQUENCY SEARCH

FIG. 9B A 
FIG. 9C B 
FIG. 9D NAVIGATION MASSAGE 
BIT TRANSITION

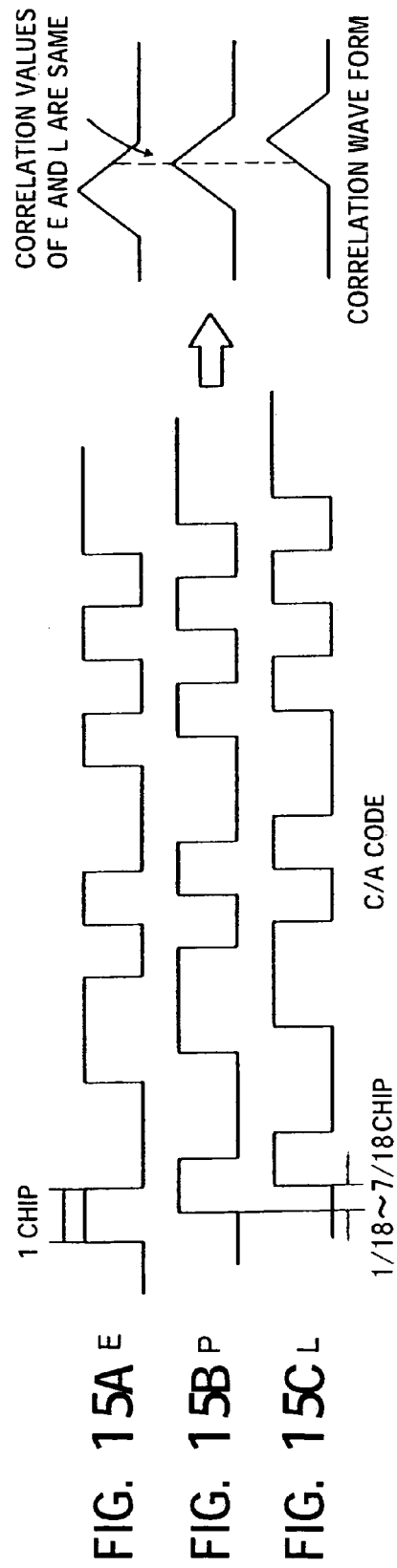
FIG. 15A E
FIG. 15B P
FIG. 15C L

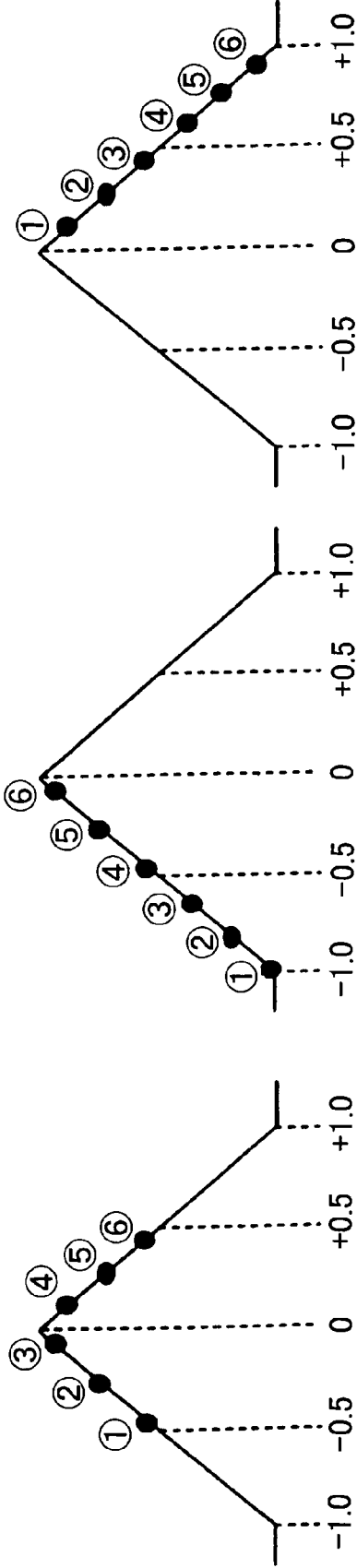

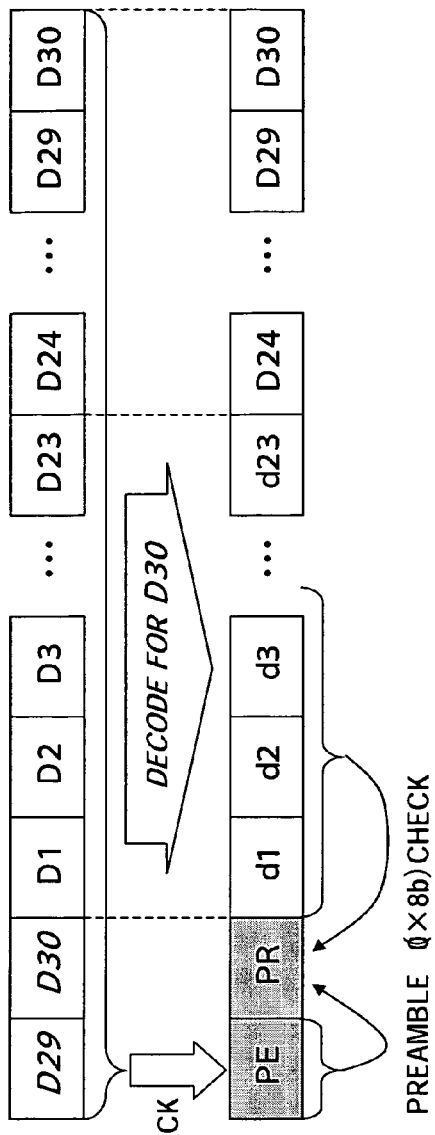

COMMUNICATION DEVICE

BACKGROUND OF THE INVENTION

1. Field of the Invention

The present invention relates to a communication device mounted on, for example, a global positioning system (GPS) on a portable terminal such as a mobile phone.

2. Description of the Related Art

In a GPS system for measuring the position of a mobile body utilizing satellites (GPS satellites), a basic function of the GPS receiver is to receive signals from four or more GPS satellites, calculate the position of the GPS receiver from the received signal, and inform that to users.

The GPS receiver demodulates a signal from a GPS satellite to acquire orbital data of the GPS satellite, and derives its own three-dimensional position from information of the GPS satellite orbit and time and delay time of the received signal by simultaneous equations.

The reason why four GPS satellites giving the received signal are required is that there is an error between the time inside the GPS receiver and the time in the satellites and that error must be eliminated.

That is to say, the GPS receiver can calculate the positioning by receiving the radio transmitted from the GPS satellites.

In the case that radio from four or more satellites can be received, by dividing the deference from the transmission time of each satellite signal and the receiving time of the GPS receiver by the velocity of light the distance to the satellite is obtained, from the distance of the GPS receiver to each GPS satellite the position of the GPS receiver and the present time can be obtained.

Further, by using a reference frequency that is had inside of the GPS receiver, the received frequency from each satellite is obtained, and the velocity of the GPS receiver and an error of the reference frequency can be obtained from the received frequency (refer to "improved edition basic of GPS survey", Atsushi Tsuchiya and Hiromichi Tsuji work, Japanese association of surveyors).

Moreover, inside of the GPS receiver, the GPS signal is acquired by using the above reference frequency that a crystal oscillator generates, and by tuning it to the frequency of the radio transmitted from the GPS satellites, and the received frequency from the GPS satellites is obtained.

A general GPS system, as shown in FIG. 1, has an antenna 1 receiving the radio of not illustrated GPS satellites, a crystal oscillator 2 generating the reference frequency used by a GPS receiver, a GPS receiver acquiring and calculating the positioning by using a GPS signal received by the antenna 1 and a frequency generated by the crystal oscillator 2, and a host CPU controlling the GPS receiver.

This general GPS system supplies the electric power to the GPS receiver 3 always from a power source for obtaining the position-finding position at high speed, and makes the GPS receiver store an error value of the reference oscillation frequency of the crystal oscillator 2. Moreover, the GPS receiver 3 uses a signal received by the antenna 1 received and frequency generated by the crystal oscillator 2, makes the frequency as reference frequency, acquires the GPS signal and calculates positioning, and the host CPU 4 obtains the result from the GPS receiver 3.

A general process of the GPS system will be explained further concretely.

In the case of a consumer GPS receiver, a positioning computation is carried out by receiving a spread spectrum signal radio referred to as the L1 band or C/A (coarse acquisition or clear and acquisition) code from a GPS satellite (Navstar).

The C/A code is a signal obtained by the binary phase shift keying (BPSK) modulating a carrier wave (hereinafter referred to as a "carrier") having a frequency of 1575.42 MHz by a signal obtained by spreading data of 50 bps by a code of a pseudorandom noise (PN) sequence having a transmission signal rate (chip rate) of 1.023 MHz and a code length of 1023, for example, the Gold code.

In this case, since the code length is 1023, the C/A code is formed as a code that a PN sequence code is repeated using 1023 chips as one cycle (=1 millisecond (msec)) as shown in FIG. 2A.

The PN sequence code of this C/A code is different for every GPS satellite, but is composed so that which GPS satellite uses which PN sequence code can be detected by the GPS receiver in advance.

Moreover, the navigation message mentioned above enables the GPS receiver to turn out from which GPS satellite signals can be received at the position and the point of the time.

Therefore, in the case of for example three-dimensional positioning, the GPS receiver receives radios from four or more GPS satellites which can be acquired at the position and the point of the time, despreads the spectrum, and performs the positioning computation to find its own position.

Then, as shown in FIG. 2B, one bit of satellite signal data is transmitted as 20 cycles of the PN sequence code, that is to say, 20 milliseconds. Namely, data transmission rate is 50 bps.

In 1023 chips of one cycle of the PN sequence code are inverted between when the bit is "1" and when the bit is "0".

As shown in FIG. 2C, in the GPS, one word is formed by 30 bits (600 milliseconds). Further, as shown in FIG. 2D, one sub-frame (6 seconds) is formed by 10 words.

As shown in FIG. 2E, the word at the header of one sub-frame has a preamble always regarded as a bit pattern even if data is updated inserted to it, after this preamble data is transmitted.

Further, one frame (30 seconds) is formed by five sub-frames. In addition, the navigation message is transmitted by data units of this one frame. The first three sub-frames in this one frame data from information inherent in the satellite referred to as ephemeris information. This information includes parameters for finding the orbit of the satellite and transmission time of the signal from the satellite.

All GPS satellites have atomic clocks and use common time information, the transmission time of the signal from the GPS satellite is a one second unit of the atomic clock. Moreover, the PN sequence code of the GPS satellite is generated as a code in synchronization with the atomic clock.

The orbital information in the ephemeris information is updated every several hours, however, until the information is updated, it is the same information.

However, by holding the orbital information of the ephemeris information in the memory of the GPS receiver, the same information can be precisely used for several hours.

Note that the transmission time of the signal from the GPS satellite is updated every one second.

The navigation message of the remaining two sub-frames in one frame data is information commonly transmitted from all the GPS satellites referred to as almanac information.

This almanac information needs 25 frames in order to acquire all information, and it is composed of approximate position information of each GPS satellite and information indicating which GPS satellite can be available and so on. This almanac information is updated every several months, however, until the information is updated, it is the same information.

However, by holding the almanac information in the memory of the GPS receiver, the same information can be used at high accuracy for several months.

For receiving the GPS satellite signal and obtaining the above data, first, after removing the carrier, the PN sequence code (hereinafter PN sequence code will be referred to as PN code) the same as the C/A code used in the GPS satellite to be received prepared in the GPS receiver is used to acquire, the signal from the GPS satellite and spread the spectrum.

When the phase synchronization with the C/A code and the despread is performed, the bit is detected and it becomes possible to acquire the navigation message including time information from the GPS satellite signal.

The acquisition of the signal from the GPS satellite is performed by phase synchronization search of the C/A code, in this phase synchronization search, the correlation between the PN code of the GPS receiver and the PN code of the received signal from the GPS satellite is detected. For example, when the correlation value of the result of the correlation detection is larger than preset value, it is judged that both are synchronized. When it is judged that synchronization has not been established, any kind of synchronization technique is used to control the phase of the PN code of the GPS receiver to synchronize with the PN code of the received signal.

Incidentally, as mentioned above, the GPS satellite signal is a signal that carrier is BPSK-modulated by a signal that data is spread by a spread code. Therefore, in order that the GPS receiver receives the GPS satellite signal, it is necessary to establish synchronization of not only the spread code but the carrier and the data, however, synchronization of the spread code and the carrier cannot be independently performed.

Further, in the GPS receiver, the received signal is converted carrier frequency of that to an intermediate frequency within several MHz, and it is general that the synchronization detection process mentioned above is performed by an intermediate frequency signal.

The carrier in the intermediate frequency signal includes a frequency error mainly due to a Doppler shift according to the velocity of the GPS satellite and a frequency error of a local oscillator generated inside the GPS receiver when the received signal is converted to an intermediate frequency signal.

Therefore, due to these frequency error factors, the carrier frequency in the intermediate frequency signal is unknown, so a frequency search for that becomes necessary.

Moreover, since a synchronization point (synchronization phase) in one cycle of the spread code depends on positional relationship between the GPS receiver and the GPS satellite so is unknown, some kind of synchronization technique becomes necessary.

The GPS receiver uses a synchronization technique by a frequency search for the carrier and a sliding correlator+ DLL (Delay Locked Loop)+Costs loop.

This will be explained below.

The clock driving a generator of the PN code of the GPS receiver is generally a clock obtained by dividing an oscillation signal of a reference frequency oscillator provided in the GPS receiver.

As this reference frequency oscillator, a high accuracy crystal oscillator is used, and a local oscillation signal used for converting the received signal from the GPS satellite to an intermediate frequency signal is generated from the output of this reference oscillator.

FIG. 3 is a view for explaining this frequency search.

As shown in FIG. 3, when the frequency of the clock signal for driving the generator of the PN code of the GPS receiver is a certain frequency f1, the phase able to establish the synchronization is made to be detected by phase synchronization search of the PN code, that is to say, by sequentially shifting the phase of the PN code by each one chip, detecting correlation between the GPS received signal and the PN signal in each chip phase and detecting the peak value of correlation.

When the frequency of the clock signal is f1, and there is no synchronized phase in all phase search of 1023 chips does not exist, for example the frequency division ratio for the reference frequency oscillator is changed, the frequency of the drive clock signal is changed to f2, and the phase search of 1023 chips are performed in the same way.

As shown in FIG. 3, this is repeated by stepwise changing the frequency of the drive clock signal.

The above operation comprises the frequency search.

Moreover, by this frequency search, when frequency of the drive clock signal regarded to be possible to be synchronized is detected, the final phase synchronization of the PN code is carried out at the clock frequency.

However, the above-mentioned technique as a synchronization method is unsuitable for fast synchronization in principle, in an actual receiver, it would be necessary to search for the synchronization point in parallel by forming multi-channels for compensating the unsuitableness. Moreover, if the time is required for synchronization of the spread code and the carrier as mentioned above, the response of the GPS receiver becomes slow, and inconvenience is arisen for usual use.

Consequently, as for the phase synchronization of the spread code, without using a method of sliding correlation as mentioned above, a technique that the phase synchronization by a digital matched filter using fast Fourier transform (FFT) processing is realized by the improvement of the capability of the hardware such as a digital signal processor (DSP).

Incidentally, in a reference frequency oscillator applied to the GPS system, an oscillation frequency is basically fixed, however, since a frequency generated by a crystal oscillator has an error due to the temperature change, the secular change and so on, the frequency range for searching the radio from the GPS satellite is needed to be defined in a wide range, therefore in a conventional GPS system, there is a disadvantage that the time is required for acquiring the signal from the GPS satellite.

Moreover, in the conventional GPS system, for obtaining the positioning computation at high speed, it becomes necessary to supply electric power continually for the GPS receiver 3. In addition, in the case that the electric power is supplied only when the positioning result is required, since the frequency error value of the crystal oscillator cannot be held, the frequency range including this error is searched, as a result, the time was required for the positioning computation.

SUMMARY OF THE INVENTION

An object of the present invention is to provide a communication device able to obtain a position-finding result at high speed and able to reduce the electric power consumption.

To attain the above object, a first aspect of the present invention, there is provided a communication device for demodulating the received signal by a spread code having, an oscillator generating an oscillation signal having a reference frequency, and a receiver using a signal having the reference frequency oscillated by the oscillator, wherein the receiver has a first means for converting the received signal to an intermediate frequency signal based on the oscillation signal by the oscillator, a second means for calculating positioning by receiving the intermediate frequency signal and obtaining frequency error of the oscillation signal, a storage unit able to store frequency error value obtained in the positioning computation, and a third means for performing a search for a satellite signal based on the frequency error value stored in the storage unit, and the storage unit can read and write the frequency error value from the external.

A second aspect of the present invention, there is provided a communication device for demodulating a received signal by a spread code having, an oscillator generating the oscillation signal of the reference frequency, a receiver using a signal having the reference frequency oscillated by the oscillator, a first storage unit able to store the frequency error value obtained from the receiver, and a host circuit storing the frequency error value obtained from the receiver in the first storage unit and transmitting the frequency error value stored in the first storage unit to the receiver, wherein the receiver has a first means for converting the received signal to an intermediate frequency signal based on the oscillation signal by the oscillator, a second means for calculating positioning by receiving the intermediate frequency signal and obtaining the frequency error of the oscillation signal, a second storage unit able to store the frequency error value obtained at the positioning computation, and a third means for performing a search for a satellite signal based on the frequency error value stored in the second storage unit, and the second storage unit can read and write the frequency error value from the host circuit.

Preferably, the host circuit reads out the error value of the reference frequency of the oscillator obtained when the receiver calculated the positioning from the second storage unit of the receiver and stores it in the first storage unit, and transmits the error value from the first storage unit to the second storage unit of the receiver when the present position is needed next.

Preferably, a communication device has an electric power source control unit controlling the supply of electric power to the receiver and the oscillator, and the electric power source control unit supplies the electric power to the receiver and the oscillator when the present position is needed, and transmits the error value from the first storage unit to the second storage unit of the receiver when the present position is needed next.

A third aspect of the present invention, there is provided a communication device having a first communication portion including a first oscillator outputting the reference signal of which oscillation frequency changes by a predetermined frequency in accordance with the communication condition, wherein the second communication portion demodulating the received signal by the spread code has a second oscillator generating the oscillation signal of reference frequency and a receiver using a signal having the reference frequency oscillated by the second oscillator, the receiver has a first means for converting the received signal to intermediate frequency signal based on the oscillation signal by the second oscillator, a second means for calculating positioning by receiving the intermediate frequency signal and obtaining the frequency error of the oscillation signal, a storage unit able to store the frequency error value obtained at the positioning computation, and a third means for performing search for satellite signal based on the frequency error value stored in the storage unit, and the storage unit can read and write the frequency error value from the external.

A fourth aspect of the present invention, there is provided a communication device having a first communication portion including a first oscillator outputting the reference signal of which oscillation frequency changes by a predetermined frequency in accordance with communication condition and a second communication portion demodulating the received signal by the spread code, wherein the second communication portion has a second oscillator generating oscillation signal of reference frequency, a receiver using a signal having the reference frequency oscillated by the second oscillator, a first storage unit able to store the frequency error value obtained from the receiver and a host circuit storing the frequency error value obtained from the receiver in the first storage unit and transmitting the frequency error value stored in the first storage unit to the receiver, the receiver has a first means for converting the received signal to the intermediate frequency signal based on the oscillation signal by the second oscillator, a second means for calculating positioning by receiving the intermediate frequency signal and obtaining the frequency error of the oscillation signal, a second storage unit being possible to store the frequency error value obtained at the positioning computation, and a third means for performing a search for a satellite signal based on the frequency error value stored in the second storage unit, and the second storage unit can read and write the frequency error value from the host circuit.

According to the present invention, for example by the control of the electric power source control unit, the electric power is supplied to the receiver and the oscillator (the electric power is turned on).

Next, the host circuit extracts (reads out) the error value of the oscillator with the reference oscillation frequency obtained at the previous positioning from the first storage unit, and the host circuit transmits the frequency error value of the oscillator to the second storage unit of the receiver.

Herewith, the receiver is made to search for, for example, the GPS satellite, and the positioning result is obtained.

The host circuit reads out and obtains the error value of the oscillator with the reference oscillation frequency obtained at the positioning computation, and stores the obtained frequency error value of the oscillator to the first storage unit.

Then, by the control of the electric power source control unit, the supply of electric power to the receiver and the oscillator is stopped.

BRIEF DESCRIPTION OF THE DRAWINGS

These and other objects and features of the present invention will become clearer from the following description of the preferred embodiments given with reference to the accompanying drawings, in which:

FIGS. 2A to 2E are views of the configuration of signal from a GPS satellite;

FIGS. 9A to 9D are views for explaining a processing of removal of a navigation message of the DSP of the acquisition unit;

FIGS. 15A to 15C are views for explaining a phase control operation in a DLL of the tracking unit according to the present embodiment;

FIGS. 20A to 20C are views for briefly explaining search of a PN phase of the control unit according to the present embodiment; and FIGS. 21A and 21B are views for explaining a decoding function of a navigation message (one word) of the control unit according to the present embodiment.

DESCRIPTION OF THE PREFERRED EMBODIMENTS

Preferred embodiments of the present invention will be described in detail below while referring to the attached figures.

Figure 1:
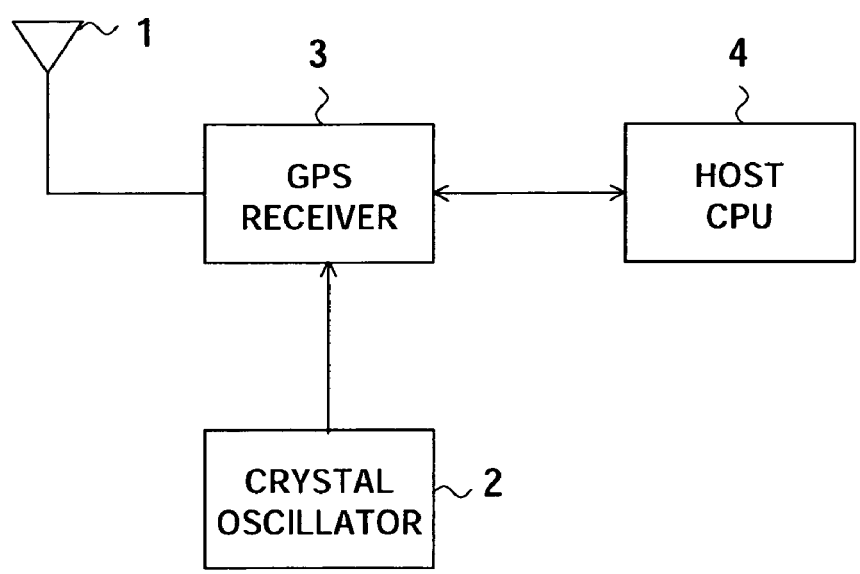
FIG. 1 is a block diagram of a general GPS system.
Figure 3:
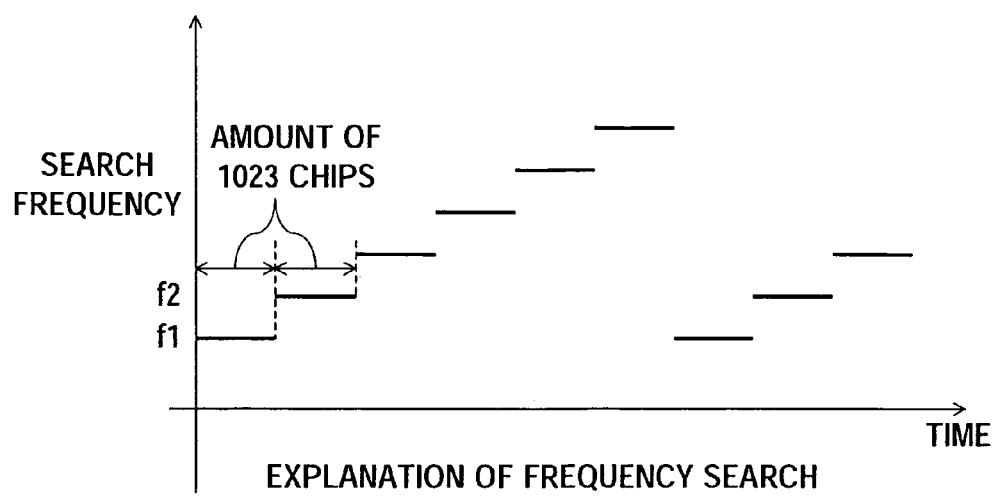
FIG. 3 is a view of an example of synchronous processing of a carrier and a spread code.
Figure 4:
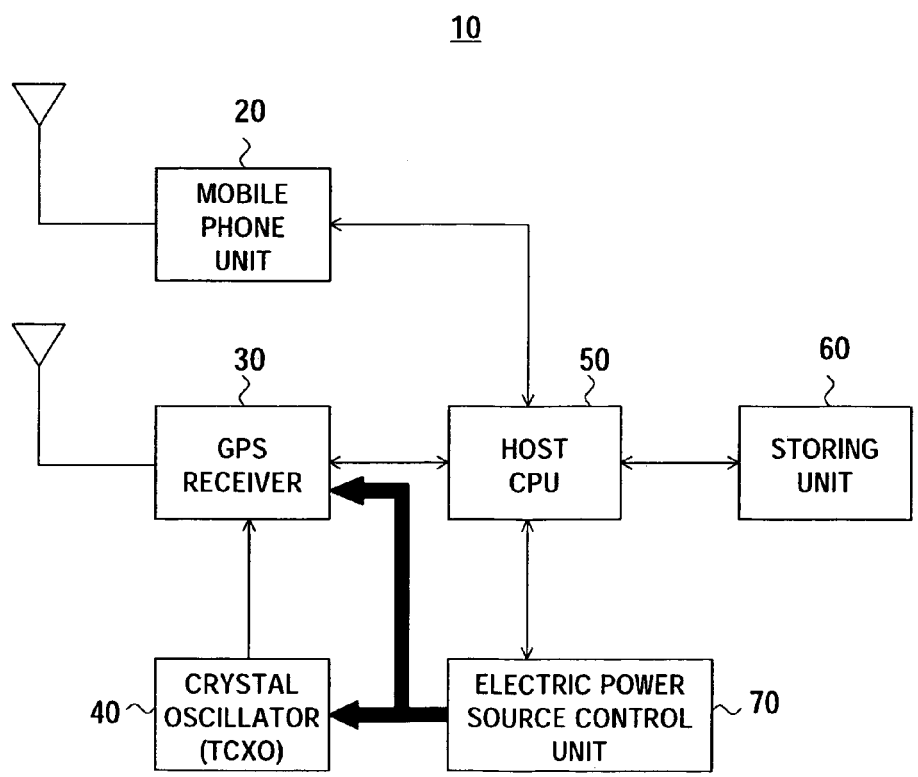
FIG. 4 is a block diagram of a brief of an embodiment of a communication device according to the present invention.

FIG. 4 is a block diagram of a brief of an embodiment of a communication device according to the present invention.

This communication device is composed by unifying a mobile phone as a networked portable device and a GPS receiver.

The present communication device 10 has, as shown in FIG. 4, a mobile phone unit 20, a GPS receiver 30 including a GPS front end portion (GPSFE) and a GPS baseband portion (GPSBB) and having a function of performing a GPS positioning computation from RF signal received by an antenna, a crystal oscillator (a second oscillator) 40 generating reference oscillation frequency used in the GPS receiver, a host CPU (a control unit) 50 storing obtained information into a storage unit and transmitting that to the GPS receiver 30 at the next time of positioning computation, a storage unit (a first storage unit) 60 storing information obtained from the GPS receiver 30, and an electric power source control unit 70 controlling power supply to the GPS receiver and the crystal oscillator as main components.

Hereinafter, after explaining a brief of a controlling system of the GPS receiver of the present communication device first, and a detail configuration and function of each part will be explained.

The communication device 10 according to the present embodiment is composed so that it is possible to output an error value from the reference oscillation frequency of the crystal oscillator 40 found at the positioning computation in the GPS receiver 30 by the instructions from the host CPU 50.

In other words, it is composed so that the error value of a reference frequency can be made to input to the GPS receiver by the instructions from the external, when searching GPS satellite radio and the searching can be started by correcting with the error value to center frequency of searching.

Namely, the communication device 10 according to the present embodiment obtains the error value of the reference oscillation frequency of the crystal oscillator obtained when the GPS receiver 30 performed the positioning computation from the GPS receiver 30 to store in the storage unit 60, and transmits the error value from the storage unit 60 to the GPS receiver 30 when the present position is required next.

Also, the electric power source control unit 70 of the communication device 10 according to the present embodiment supplies electric power to the GPS receiver 30 and the crystal oscillator 40 when the present position is required, and halts power supply to the GPS receiver 30 and the crystal oscillator 40 until the present position is required next.

Figure 5:
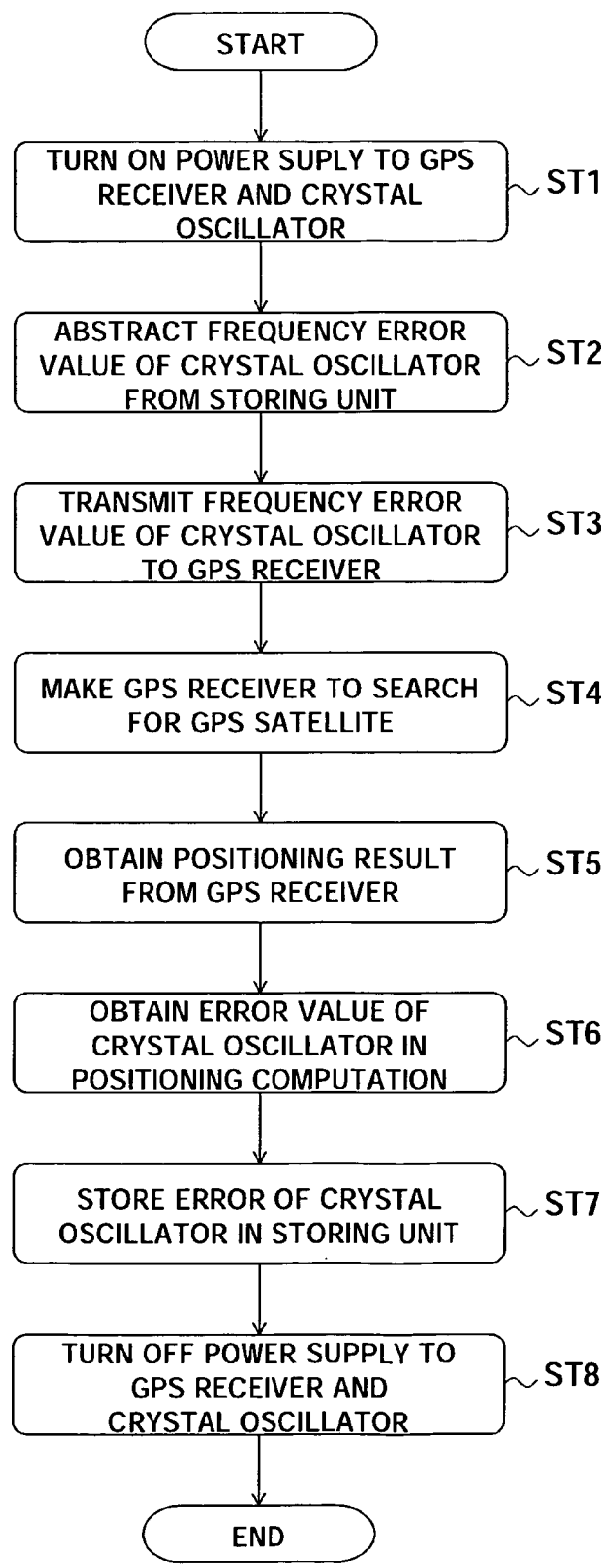
FIG. 5 is a flow chart for explaining the process for obtaining a position-finding result of the communication device according to the present embodiment.

Here, a process to obtain a position-finding result of the communication device 10 according to the present embodiment will be explained with reference to a flow chart of FIG. 5.

At step ST1, electric power is supplied to the GPS receiver 30 and the crystal oscillator 40 by the control of the electric power source control unit 70 (power supply source is switched on).

At step ST2, the host CPU 50 extracts (reads out) the error value from the reference oscillation frequency of the crystal oscillator 40 found at the time of a previous position-finding from the storage unit 60.

At step ST3, the host CPU 50 transmits the frequency error value of the crystal oscillator 40 to the GPS receiver 30.

At step ST4, the GPS receiver 30 is made to search the GPS satellite.

At step St5, the position-finding result is obtained from the GPS receiver 30.

At step ST6, the host CPU 50 obtains the error value from the reference oscillation frequency of the crystal oscillator 40 found at the time of positioning computation from the GPS receiver 30.

At step ST7, the host CPU 50 stores the obtained error value from the reference oscillation frequency of the crystal oscillator 40 into the storage unit 60.

Finally, at step ST8, the electric power supply to the GPS receiver 30 and the crystal oscillator 40 is halted by the control of the electric power source control unit 70.

In this way, in the communication device 10 according to the present embodiment, the host CPU 50 obtains the error value of the reference oscillation frequency of the crystal oscillator 40 from the GPS receiver, stores the same into the storage unit 60, corrects the reference frequency by transmitting this value to the GPS receiver in next positioning computation to make to search the GPS satellite. As a result, it is necessary to supply the electric power to the GPS receiver 30 and the crystal oscillator 40 except for the time of position-finding computation, the positioning result can be obtained at the high speed with reducing electric power consumption.

Next, the concrete configuration and function of each element unit of the communication device according to the present embodiment will be explained centering on the GPS receiver 30.

Figure 6:
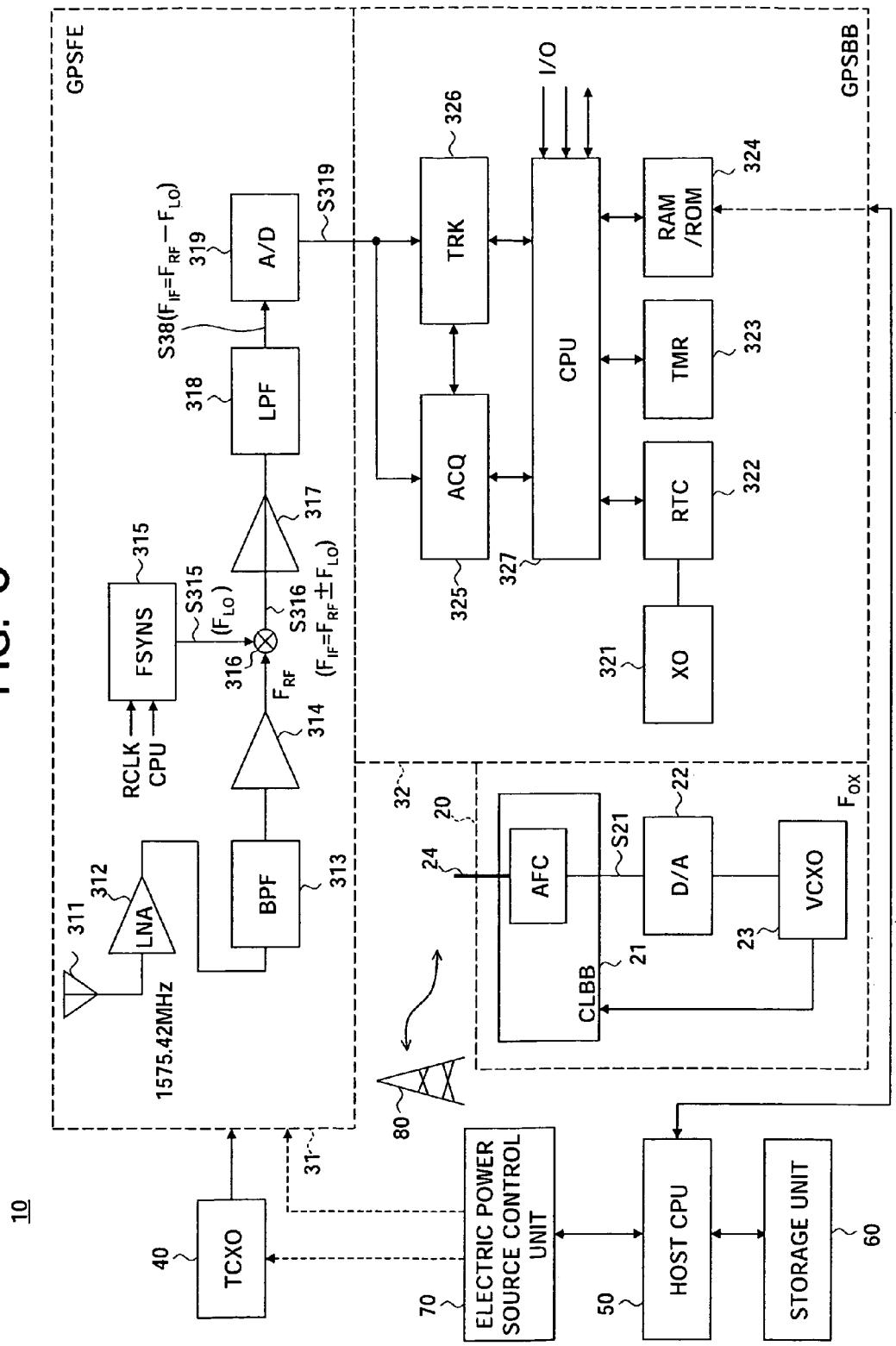
FIG. 6 is a block diagram of an example of a concrete configuration of the communication device according to the present invention.

FIG. 6 is a block diagram of an example of a concrete configuration of the communication device according to the present embodiment.

The communication device 10 has, as shown in FIG. 6, a mobile phone unit 20, a GPS receiver 30 having a GPS front end unit (GPSFE) 31 and a GPS baseband unit (GPSBB) 32 as main components, a crystal oscillator (TCXO) 40, a host CPU 50, a storage unit 60, and an electric power source control unit 70. In addition, a reference 80 shows a base station for the mobile phone.

Note that, a first communication portion is composed of the mobile phone unit 20, while a second communication portion is composed of the GPS front end unit 31 and the GPS baseband unit 32.

The mobile phone unit 20 has mobile phone functions, which can be applied to a mobile communication device, for example, a cellular system.

The mobile phone unit 20 has, as shown in FIG. 6, a cellular baseband-unit (CLBB) 21, a digital/analog (D/A) converter 22, a reference frequency oscillator (VCXO) 23 as a first oscillator, and a transmission and reception antenna 24.

The baseband unit 21 is synchronized with a reference signal from the reference frequency oscillator 23, thereby performing a telephone call with an adjacent base station through the transmission and reception antenna 24, or a transmission and reception control of predetermined data.

Further, since if the base station 80 of the other party changes, the oscillation frequency of the reference frequency oscillator 23 is made to change according to the established protocol, the baseband unit 21 generates a frequency change signal S21 for reporting that the base station has changed and frequency is to be changed, and outputs the same to the D/A converter 22.

The D/A converter 22 converts a digital frequency change signal S21 from the baseband unit 21 to an analog frequency change signal S21 and outputs it to the reference frequency oscillator 23.

The reference frequency oscillator 23 changes the oscillation frequency in accordance with a frequency change instruction of the analog frequency change signal S21 by the D/A converter 22 by Δf (for example 0.7 Hz), and supplies a reference signal Fox having a frequency f±Δf after the change to the baseband unit 21.

The GPS front end unit 31 receives a radio GPS signal RF of which a high frequency from the GPS satellite is 1575.42 MHz, amplifies the weak GPS signal, converts the frequency to the intermediate frequency (IF) signal of 1.023 MHz, further converts the analog IF signal to the digital IF signal and supplies it to the GPS baseband unit 32.

The GPS front end unit 31, as shown in FIG. 6, has an antenna 311, a low noise amplifier (LNA) 312, a band pass filter 313 made of SAW filter, an amplifier 314, a frequency synthesizer (FSYNS) 315, a mixer 316, an amplifier 317, a low pass filter (LPF) 318, and an analog/digital circuit (A/D) 319.

The frequency synthesizer 315 includes a PLL circuit and so on, generates an oscillation signal S315, which the frequency FL0 of the reference clock CLK is 1574.397 MHz that is 85.5 times 18.414 MHz in response to the reference clock RCLK of 18.414 MHz generated in the crystal oscillator 40, that is for example 18.414 MHz, and a control signal of CPU (including correction value), and supplies it to the mixer 316.

The mixer 316 mixes the received RF signal of frequency FRF (1575.42 MHz) and the frequency FL0 (1574.397 MHz) and converts the mixed signal to an IF signal S316 of a frequency of FIF (FRF±FIF=1.023 MHz, 3139.817 MHz).

The LPF 318 outputs an IF signal S318 obtained at the mixer 316 and only low passed the following component of IF signal S316 through the amplifier 317, that is to say, the frequency FIF (FRF−FL0=1.023 MHz).

Note that, when the error of the reference clock RCLK is defined as ΔFRCLK (about ±3 ppm), the frequency FL0 of the oscillation signal S315 of the frequency synthesizer 315 is given by the following equation:

$$FL0 = 85.5 \times (18.414 \text{ MHz} + \Delta FRCLK)$$

Moreover, when the Doppler shift is defined as AD, the frequency FIF of the IF signal S318 is given by the following equation from the LPF:

$$FIF = 1.023 \text{ MHz} + \Delta D + 85.5 \times \Delta FRCLK$$

Note that, the cycle T of the received C/A code is not changed according to the conversion of frequency conversion from the RF signal to the IF signal. That is to say, this is irrelevant to the error AFRCLK of the reference clock RCLK. The fluctuation of the cycle T is for example about (1 ms+change due to Doppler shift).

In the GPS front end unit 31, the radio RF signal of the format from the GPS satellite as shown in FIG. 2 having a frequency of 1575.42 MHz is received at the antenna 311.

The received RF signal is amplified at the low noise amplifier 312, any signal out of the GPS signal band is removed at the BPF 313 as the SAW filter, and is input to the mixer 316 through the amplifier 314.

In the mixer 316, it is mixed with the oscillation signal S315 by the frequency synthesizer 315, and the IF signal S318 having a frequency of 1.023 MHz is extracted through the amplifier 317 and the LPF 318.

The IF signal S318 is converted to the digital signal in the analog/digital circuit 319, and is output to the GPS baseband unit 32 as the IF signal S319 that is a one bit serial signal.

The GPS baseband unit 32 receives the IF signal S319 by the GPS front end unit 31, performs acquisition for finding the synchronization point initially or in the case that the system largely deviates from synchronized state, and performs tracking for controlling the delay difference to be sufficiently smaller than 1 chip length of the spread code after the acquisition, and for establishing synchronization of the C/A code and career based on the clock of the crystal oscillator 40, and in addition, performs several processes, such as positioning computation or position search, based on range data, Doppler shift, a navigation message, time and so on.

Moreover, the GPS baseband unit 32 searches the GPS satellite by receiving the reference frequency error value of the crystal oscillator 40 that the host CPU 50 transmitted, and the value was stored in the storage unit 60.

The GPS baseband unit 32 has, as shown in FIG. 6, an oscillator (XO)321, a real time clock unit (RTC) 322, a timer (TMR) 323, a memory unit (RAM/ROM) 324 as a second storage unit, an acquisition unit (ACQ) 325, a tracking unit (TRK) 326, and a control unit (CPU) 327.

The oscillator 321 generates a clock CK for a timer having a frequency of for example 32.768 kHz, and supplies that to the real time clock unit 322.

The real time clock unit 322 supplies a real time clock to the control unit 327 by receiving the clock CK from the oscillator 321.

The timer 323 transfers signals concerning time with the control unit 327, and includes a plurality of channels counting the reference clock RCLK having a frequency of for example 18.414 MHz.

A plurality of channels include for example a channel used for a usual interval timer, a channel for performing counting of several seconds or more or power management, and channels for other functions.

The memory unit 324 includes volatile ROM and RAM, and is accessed by the control unit 327.

In addition, the memory unit 324 stores for example the error value of the reference frequency of the crystal oscillator found when the control unit 327 performed the position computation, the navigation message, and a positioning computation result.

The memory unit 324 is accessible by the host CPU 50 through the control unit 327, since the supply of electric power to the GPS receiver 30 is halted in the case that the positioning computation is not performed, the error value of the reference oscillation frequency of the crystal oscillator is read out by the host CPU 50 before power supply halt and the error value of the reference oscillation frequency is evacuated to the storage unit 60.

Moreover, in the case that the positioning computation is performed next time, the host. CPU 50 reads out the previous error value of the reference oscillation frequency of the crystal oscillator stored in the storage unit 60, and stores in the memory unit 324 after power is supplied.

Here, the error value of the reference oscillation frequency will be explained.

A carrier frequency is defined as f, Doppler frequency is defined as $\Delta f$, and an error of an oscillator is defined as $\epsilon f$. A radical reception frequency is $(f\pm\Delta f)$, but is erroneously measured as $(f\pm\Delta f+\delta f)$.

When Si is defined as a unit vector of line of sight to four satellites respectively, Vi is defined as a velocity vector of each satellite, V is defined as a velocity vector of a receiver, pi is defined as radial velocity of a receiver, the following equations are obtained.

$(Vi-V)\cdot Si=\rho i$ $\Delta f = f(\rho/C)$ $f \cdot \Delta f = c \cdot \rho$ Further, when the error of the radial velocity by the frequency measurement error is defined as $\Delta\rho$, the following equation is approved.

$$\rho iobs = c(\pm\Delta f + \delta f)/f = c(\pm\Delta f/f) + c(\delta f/f) = \rho i + \Delta\rho$$

However, $\rho iobs$ can be represented by the following equation.

$(Vi-V)-Si+\Delta\rho=\rho iobs$

The unit vector of the line of sight of each satellite Si and the velocity vector of each satellite Vi are known because those can be calculated from orbital information. Since unknown numbers are three components of the velocity vector of the receiver V and the error of the radial velocity by the frequency measurement error $\Delta\rho$, if information from four satellites is obtained, those will be obtained as solutions of simultaneous equations.

The acquisition unit 325 receives the IF signal from the GPS front end unit 31 under the control of the control unit 327, performs a search of the GPS signal over a wide range (acquisition of the C/A code), processing for removal of the navigation message, and transfers the search result, the correlation detection result, and the C/A code phase, the carrier frequency, and correlation level to the control unit 327.

Figure 7:
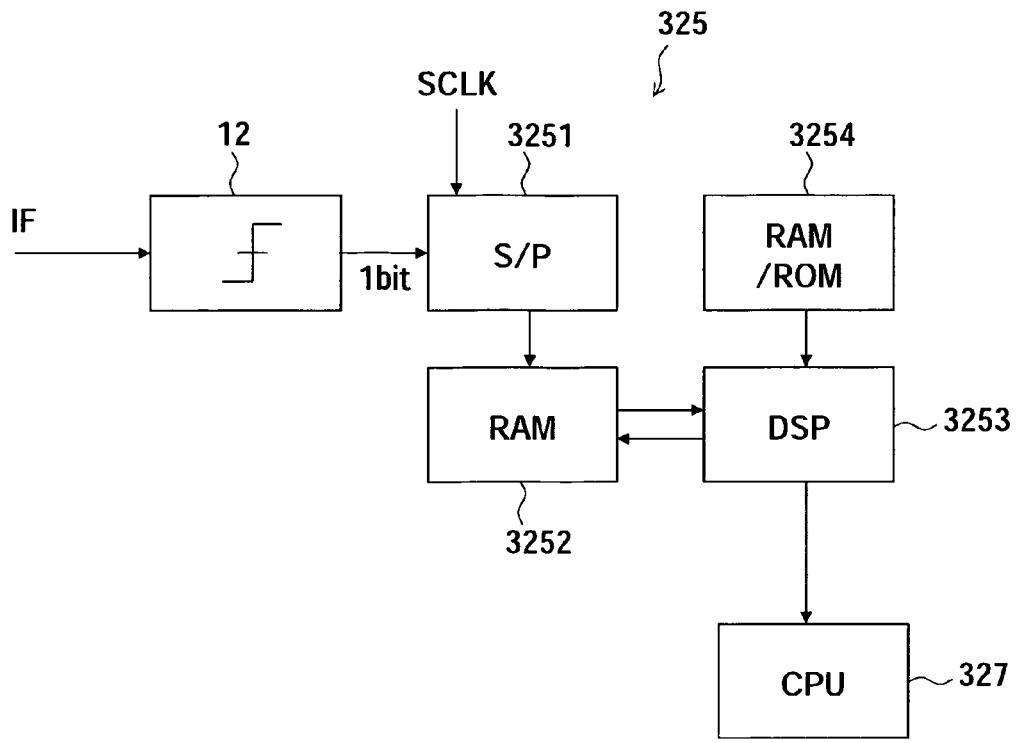
FIG. 7 is a block diagram of an example of the configuration of an acquisition unit according to the present embodiment.

FIG. 7 is a block diagram of an example of the configuration of the acquisition unit 325 according to the present embodiment.

The acquisition unit 325 has, as shown in FIG. 7, a serial/parallel converter (S/P) 3251, a RAM 3252, a DSP 3253 and a memory (RAM/ROM) 3254.

The serial/parallel converter 3251 of the acquisition unit 325 starts the sampling of the IF signal (one bit) based on the sampling clock SCLK by a command from the control unit 327, performs 4/18 thinning processing from the sample data of for example 18.414 MHz, converts the sampling signal to a parallel signal of 16 bits, and stores it in the RAM 3252. Concretely, one dummy bit is inserted for every 1023 bits to obtain 4096 samples/ms.

The DSP 3253 operates at a predetermined clock, and performs the search of the GPS signal for the data memorized in the RAM 3252.

Further, the DSP 463 utilizes an FFT to detect the correlation with the C/A code so as to increase the speed.

Further, the DSP 3253 outputs an SV number, a C/A code phase np, a carrier frequency kc, and a correlation level to the control unit 327.

Note that, the resolution in the DSP 3253 is for example 1/4 chip for the C/A code, (1/16) kHz for the carrier frequency.

Figure 8:
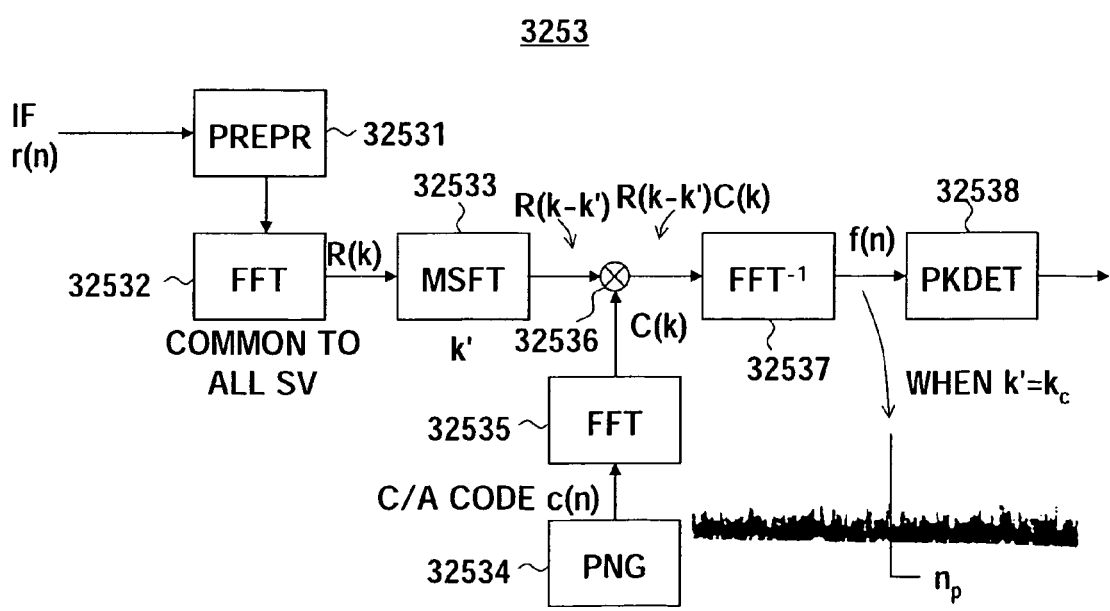
FIG. 8 is a block diagram of an example of the configuration example of a DSP of the acquisition unit according to the present embodiment.
Figure 9A:
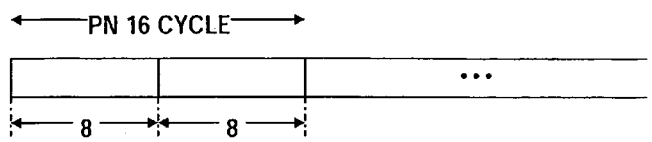

FIG. 8 is a block diagram of an example of a configuration of the DSP 3253 of the acquisition unit 325.

The DSP 3253 has, as shown in FIG. 8, has a pre-processing unit (PREPR) 32531, an FFT processing unit 32532, a memory shift unit (MSFT) 32533, a pseudorandom noise code generator (PNG) 32534, an FFT processing unit 32535, a multiplier 32536, an inverse FFT unit 32537, and a peak detection unit (PKDET) 32538.

The FFT processings of the FFT processing units 32532, 32535 are basically carried out in for example unit of 16 ms.

The pre-preprocess unit 32531 performs the pre- processing for reducing the amount of 16 ms (65536 points) to 4096 points in order to perform the FFT processing of the IF signal.

The result of the FFT processing of the FFT processing unit 32532 is input to the memory shift unit 32533 as the signal R(k), subjected to shift processing by exactly k', and input as the signal R(k–k') to the multiplier 32536.

Further, the C/A code c(n) generated at the pseudorandom noise generator 32534 is subjected to the FFT processing at the FFT processing unit 32535. The result is input as a signal C(k) to the multiplier 32536.

The multiplier 32532 multiplies the output signal R(k–k') of the memory shift unit 32533 and the output signal C(k) of the FFT processing unit 32535 and inputs the result R(k–k')·C(k) to the inverse FFT processing unit 32537.

Then, the signal f(n) obtained by the inverse FFT processing unit 32537 is input to the peak detection unit 32538, whereby the C/A code phase np, the carrier frequency kc, and the correlation level are detected and output to the control unit 327.

Further, the DSP 3253 performs processing for removal of the navigation message.

In the processing for removal of the navigation message, if there is bit inversion of this navigation message in an interval of 16 ms, the correlation will not be constant.

Therefore, for example, as shown in FIGS. 9A to 9D, the correlation value by the data sequence A having 16 cycles' length is designated as Add(++), the correlation value by data sequence B obtained by inverting the polarity of the latter half of A is inversed is designated as Add(+–), and |Add(++)|+|Add(+–)| is deemed constant. This is used as the correlation value. The bit transition position is estimated from Add(++) and Add(+–).

The tracking unit 326 has a Delay Locked Loop (DLL) as the SS demodulator and a Costas loop as principal components. Under the control of the control unit 327, it receives IF signal from the GPS front end unit 31, performs processings such as tracking of the C/A code by the DLL, tracking of the carrier by the Costas loop, and acquirement of the navigation message and the range data.

Figure 10:
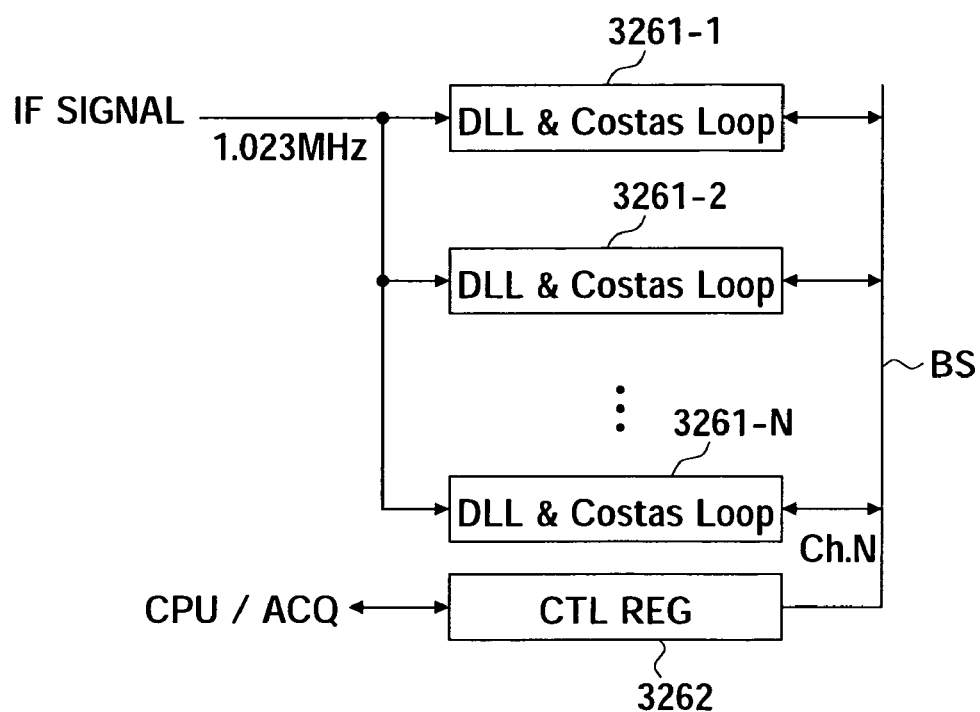
FIG. 10 is a block diagram showing the main components of a tracking unit according to the present embodiment.

The tracking unit 326 has, as shown in FIG. 10, N (for example 12) number of DLL and Costas loop units (hereinafter, referred to as loop units) 3261-1 to 3261-N connected in parallel with the input of the IF signal and a control register (CTLREG) 3262 for transferring the control data with the control unit 327 and the tracking unit 326, and transferring the control data and so on with the DLL & Costas loop units 3261-1 to 3261-N via the bus BS.

Figure 11:
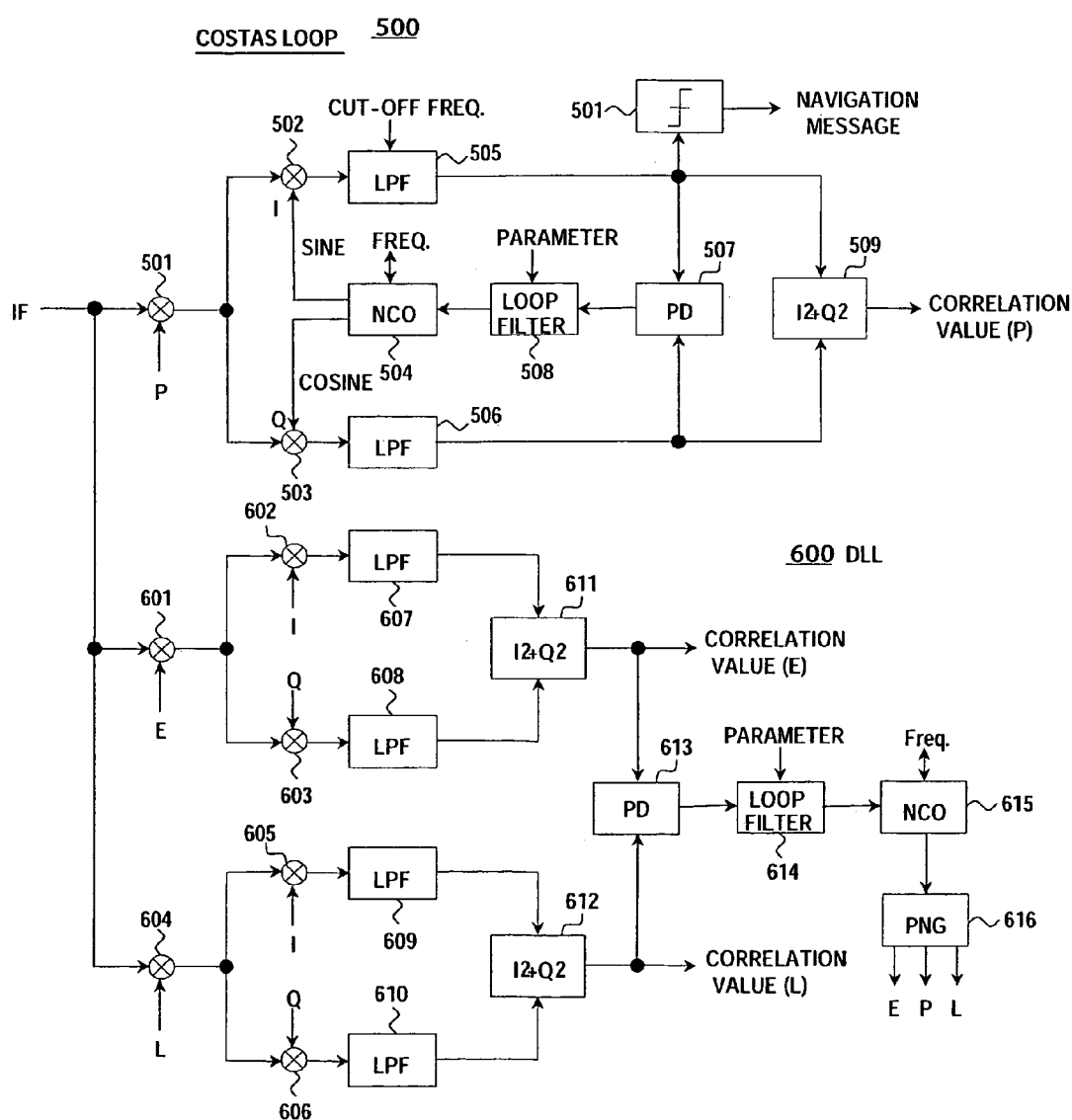
FIG. 11 is a circuit diagram of an example of a concrete configuration of a loop unit of the tracking unit according to the present embodiment.

FIG. 11 is a circuit diagram of an example of the concrete configuration of a loop unit 3261 of the tracking unit 326 according to the present embodiment.

The loop unit 3261, as shown in FIG. 11, comprises a Costas loop 500 for tracking of the carrier and the acquisition processing of the carrier frequency and the navigation message and a DLL 600 for tracking of the C/A code and the acquisition processing of an epoch signal and range data connected in parallel with respect to the input of the IF signal.

The Costas loop 500 has multipliers 501 to 503, a numerically controlled oscillator (NCO) 504, low pass filters (LPFs) 505 and 506, a phase detector (PD) 507, a loop filter 508, a correlation value operation unit 509, and a navigation message judgment unit 510.

In the Costas loop 500 and the DLL 600, the control unit 327 sets SV, the C/A code phase, and the NCO frequency from the search results of the DSP 3253 of the acquisition unit 325.

Figure 12:
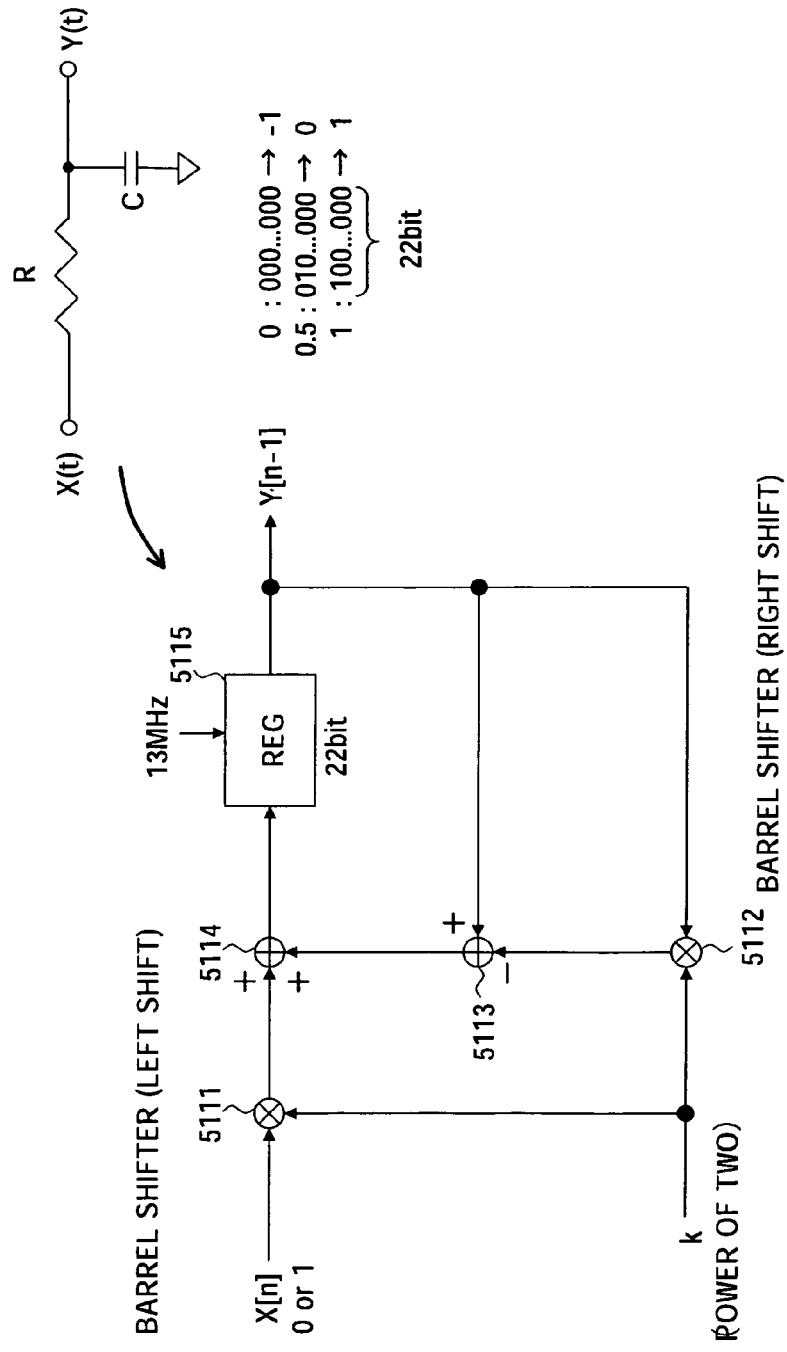
FIGS. 12A and 12B are circuit diagrams of an example of the configuration of an LPF of a Costas loop of the tracking unit according to the present embodiment.

The LPFs 505 and 506 of the Costas loop 500 are constituted by IIR filters 511 as shown in FIG. 12B modeled for example on the RC filter as shown in FIG. 12A, and remove out-of-band noise of the BPSK signals.

Each IIR filter 511 is constituted by a left shift barrel shifter 5111, a right shift barrel shifter 5112, adders 5113 and 5114, and a register (REG) 5115 of predetermined bits (for example 22 bits).

The output of the barrel shifter 5111 becomes kx[n].

The output of the barrel shifter 5112 becomes kY[n–1].

The output of the adder 5113 becomes (1–k)Y[n–1].

The output of the adder 5114 becomes Y[n]=(1–k)Y[n–1]+kx[n]. This Y[n] is a differential approximation of the RC filter.

The phase detector 507 of the Costas loop 500 detects the phase difference of the carrier and the NCO 504 at for example a 1 ms interval, controls the NCO 504 via the loop filter 508 by the detected phase difference to perform the acquisition (frequency pull-in), and thereby performs the tracking processing.

Figure 13:
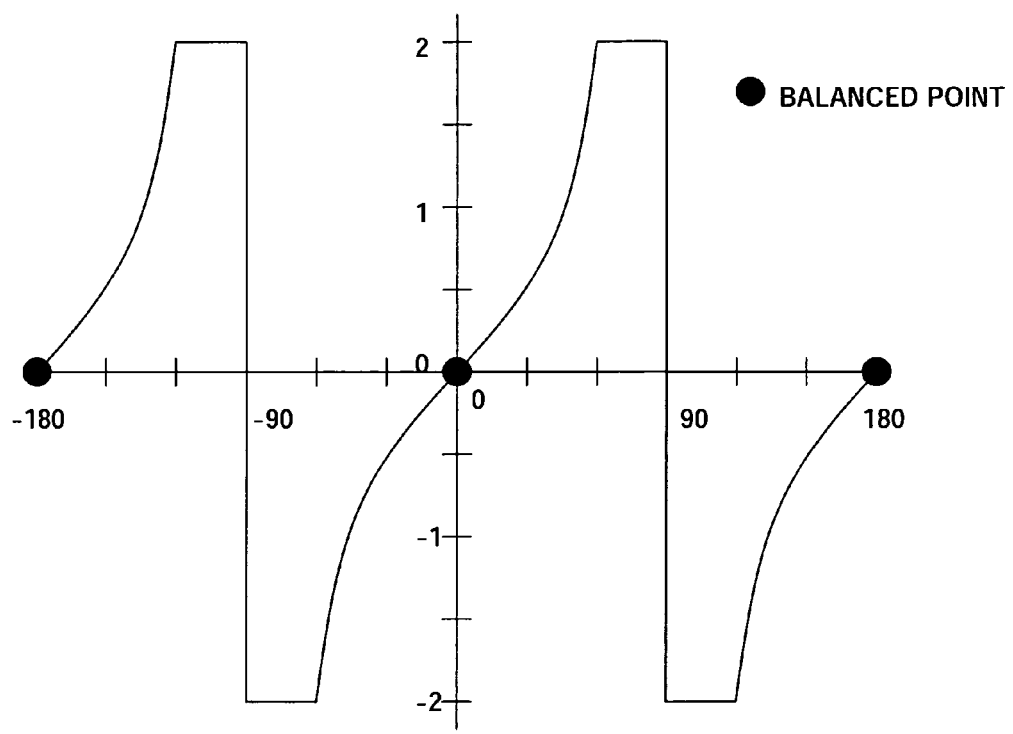
FIG. 13 is a view of characteristics of a phase detector of the Costas loop of the tracking unit according to the present embodiment.

FIG. 13 shows the characteristics of the phase detector 507 of the Costas loop 500. The phase detector 507 has a good phase comparison characteristic not depending upon the signal intensity.

The loop filter 508 of the Costas loop 500 integrates the output (phase difference) of the phase comparator 507 and controls the NCO 504.

The loop filter 508 is constituted by for example a complete integration type active filter.

Figure 14A:
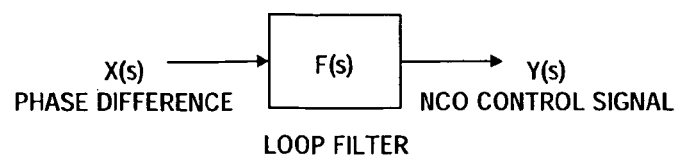
FIGS. 14A to 14C are views for explaining examples of configuration of a loop filter of the tracking unit according to the present embodiment.
Figure 14B:
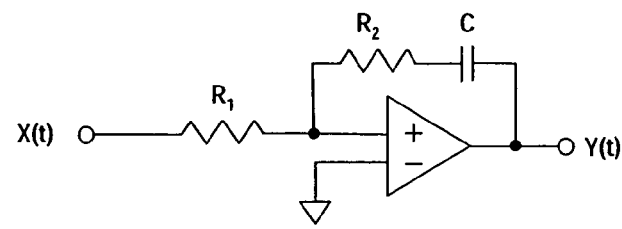

For example, the transmission function F(s) of a complete integration type loop filter such as shown in FIGS. 14a and 14B can be represented as follows:

$$F(s)=(1+s\tau 2)/s\tau 1=\tau 2/\tau 1+1/s\tau 1$$

$$s\tau 1=R1C,\ s\tau 2=R2C$$

When differentially approximated, this can be represented as follows:

$$Y[n]=Y[n-1]+a\{X[n]-X[n-1]\}+bX[n]$$

$$a=96\ 2/\tau 1,\ b=T/\tau 1$$

Where, T is the sampling cycle (1 ms).

Figure 14C:
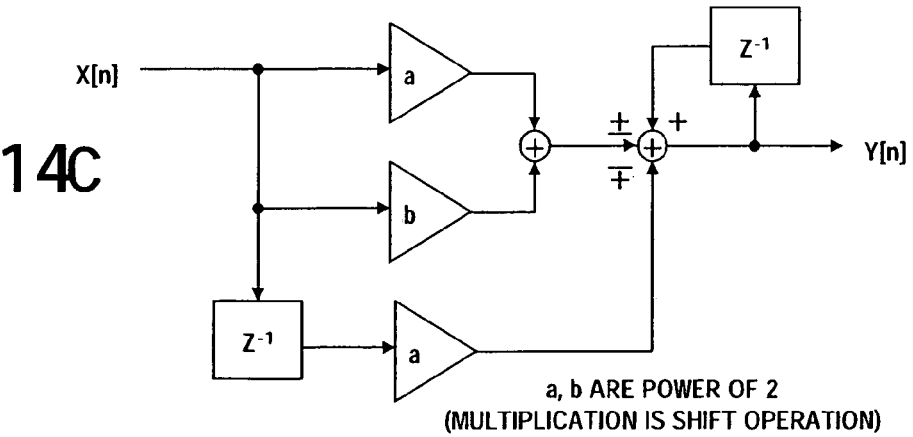

FIG. 14C shows a loop filter configured based on this equation.

Here, "a" is the magnitude of the frequency difference, and "b" is the magnitude of the control with respect to the phase difference. A suitable "a" and "b" are set from the pull-in range and noise tolerance.

Further, the search result (frequency) of the DSP 3253 of the acquisition unit 325 is made the initial value Y[0].

In the Costas loop 500 having such a configuration, the IF signal is multiplied by a prompt signal P at the multiplier 501, and the carrier synchronization carried out.

The output signal of the multiplier 501 is input to the multipliers 502 and 503. The multiplier 502 is supplied with an in-phase signal I having a predetermined frequency. The low frequency component of the multiplication result is extracted at the LPF 505 and supplied to the phase detector 507, the correlation value operation unit 509, and the navigation message judgment unit 510.

Further, the multiplier 503 is supplied with a quadrature signal Q having a predetermined frequency. The low frequency component of the multiplication result is extracted at the LPF 506 and supplied to the phase detector 507 and the correlation value operation unit 509.

Then, the detection result of the phase detector 507 is fed back to the NCO 504 through the loop filter 508, and the carrier frequency acquisition (frequency pull-in) of the BPSK signal is carried out.

Further, the correlation value operation unit 509 performs a calculation of ($I^2+Q^2$) to obtain the correlation value P and transfers it to the control unit 327 via the control register 3262.

Further, the navigation message judgment unit 510 obtains the navigation message and transfers it to the control unit 327 via the control register 3262.

The DLL 600 has multipliers 601 to 606, LPFs 607 to 610, correlation value operation units 611 and 612, a phase detector (PD) 613, a loop filter 614, a numerically controlled oscillator (NCO) 615, and a PN generator (PNG) 616.

The DLL 600 performs the synchronization processing with the C/A code included in the IF signal. The PN generator 616 independently computes the three correlation levels of a prompt or puncture signal P, an early signal E, and a late signal L, as shown in FIGS. 15A to 15C, controls the phase so that the level difference of E and L becomes the same (P is the maximum).

Note that the start timing of the PN generator 616 detects the correlation with a several chips before and after from the search results of the DSP 3253 of the acquisition unit 325.

Further, the initial value and the limiter value of the NCO 615 are set based on the search result of the DSP 3253 of the acquisition unit 325 by the control unit 327 via the control resister 3262.

The phase detector 613 detects the phase difference between the C/A code and the output of the PN generator 616 at an interval of for example 20 ms. The NCO 615 is controlled by the detected phase difference via the loop filter 614 to perform the acquisition (phase pull-in) and thereby to perform the tracking processing.

In detection of phase difference, as I and Q, use is made of signals on the side selected at P.

Figure 16A:
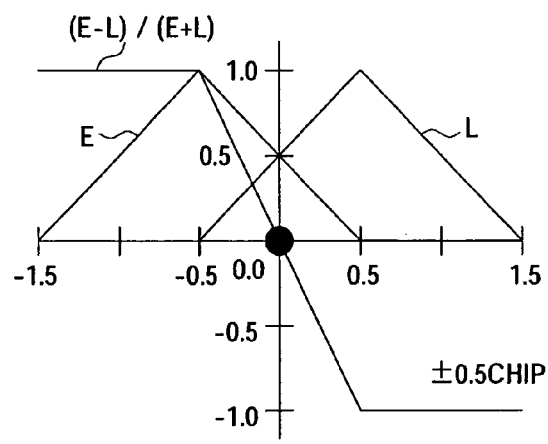
FIGS. 16A and 16B are views of the characteristics of the phase detector of the DLL of the tracking unit according to the present embodiment.
Figure 16B:
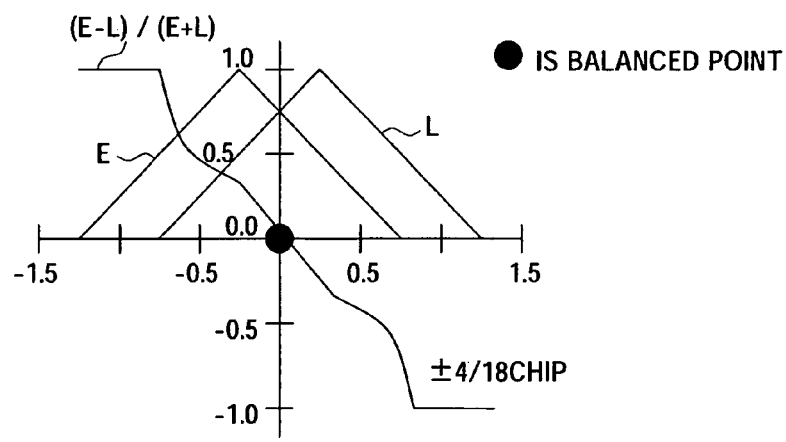

The phase characteristics of the phase detector 613 are shown in FIGS. 16A and 16B.

An example where the phase detector 613 shown in FIGS. 16A and 16B performs the calculation by setting for example (E−L)/(E+L) is shown.

FIG. 16A shows the characteristic in the case of ±0.5 chip; FIG. 16B shows the characteristic of a case of ±4/18 chip.

The loop filter 614 of the DLL 600 can be configured in the same way as the loop filter 508 of the Costas loop 500 (FIG. 14C).

Note that the sampling cycle is 20 ms.

In the DLL 600 having such a configuration, the IF signal is multiplied by the early signal E at the multiplier 601, the output signal of the multiplier 601 is input to the multiplier 602 and 603. The multiplier 602 is supplied with the in-phase signal I having a predetermined frequency. The low frequency component of the multiplication result is extracted in the LPF 607 and supplied to the correlation value operation unit 611.

Further, the multiplier 603 is supplied with the quadrature signal Q having a predetermined frequency. The low frequency component of the multiplication result is extracted at the LPF 608 and supplied to the correlation value operation unit 611. The correlation value operation unit 611 performs the calculation of ($I^2+Q^2$) to obtain the correlation value L and supplies it to the phase comparator 613.

Further, the IF signal is multiplied by the late signal L at the multiplier 604, and the output signal of the multiplier 604 is input to the multipliers 605 and 606. The multiplier 605 is supplied with the in-phase signal I of the predetermined frequency. The low frequency component of multiplication result is extracted at the LPF 609 and supplied to the correlation value operation unit 612.

Further, the multiplier 606 is supplied with the quadrature signal Q of a predetermined frequency. The low frequency component of the multiplication result is extracted at the LPF 620 and supplied to the correlation value operation unit 613. The correlation value operation unit 613 performs the calculation of ($I^2+Q^2$) to obtain the correlation value L and supplies it to the phase comparator 613.

Then, the phase detector 613 detects the phase difference between E and L, feed back the detection result through the loop filter 614 to the NCO 615, and performs the acquisition (phase pull-in).

Figure 17:
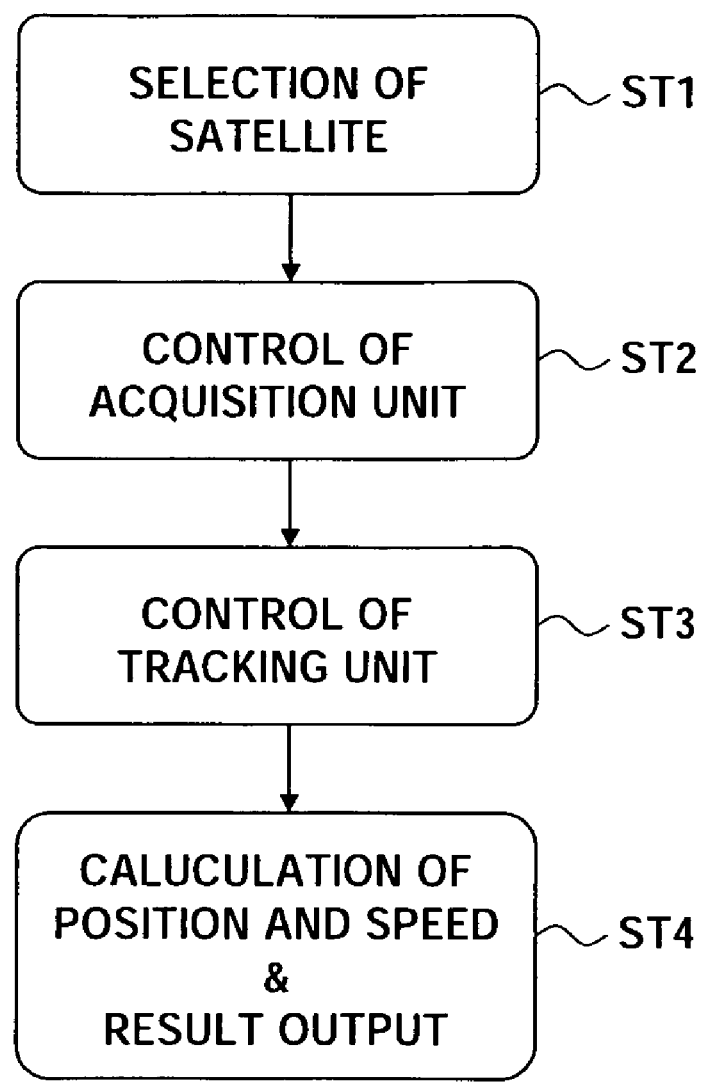
FIG. 17 is a view for briefly explaining the processing of the control unit according to the present embodiment.

The control unit 327 basically performs the processing as shown in FIG. 17.

First, at step ST1, the control unit 327 selects the satellite. Concretely, according to each the initial state of a cold start, a warm start, or a hot start, it determines the satellite for which synchronization is to be acquired and the algorithm, controls the on/off state of the GPS front end unit 31, adjust the gain, and obtains the IF signal from the GPS front end unit 31.

At step St2, the control unit 327 controls the on/off state of the acquisition unit 325, transfers a program to the acquisition unit 325, transfers the search command and SV information, and transfers various computation commands in accordance with the satellite for which synchronization is to be acquired and the algorithm, obtains the search result such as the SVID, the phase, the frequency, the level and various computation results for the acquisition unit 325, and sets the acquisition unit 325 to a standby state.

At step ST3, the control unit 327 sets the search result and the computation result of the acquisition unit 325 to the tracking unit 326, controls the on/off state for every channel of the tracking unit 326, controls the tracking, concretely, performs the initial settings, search, synchronization, and interpolation control, and obtains the range data, Doppler shift, navigation message, and time data from the tracking unit 326.

Then, at step ST4, the control unit 327 calculates the position and speed from the navigation message and the range data and so on, outputs the result according to the communication format.

Figure 18:
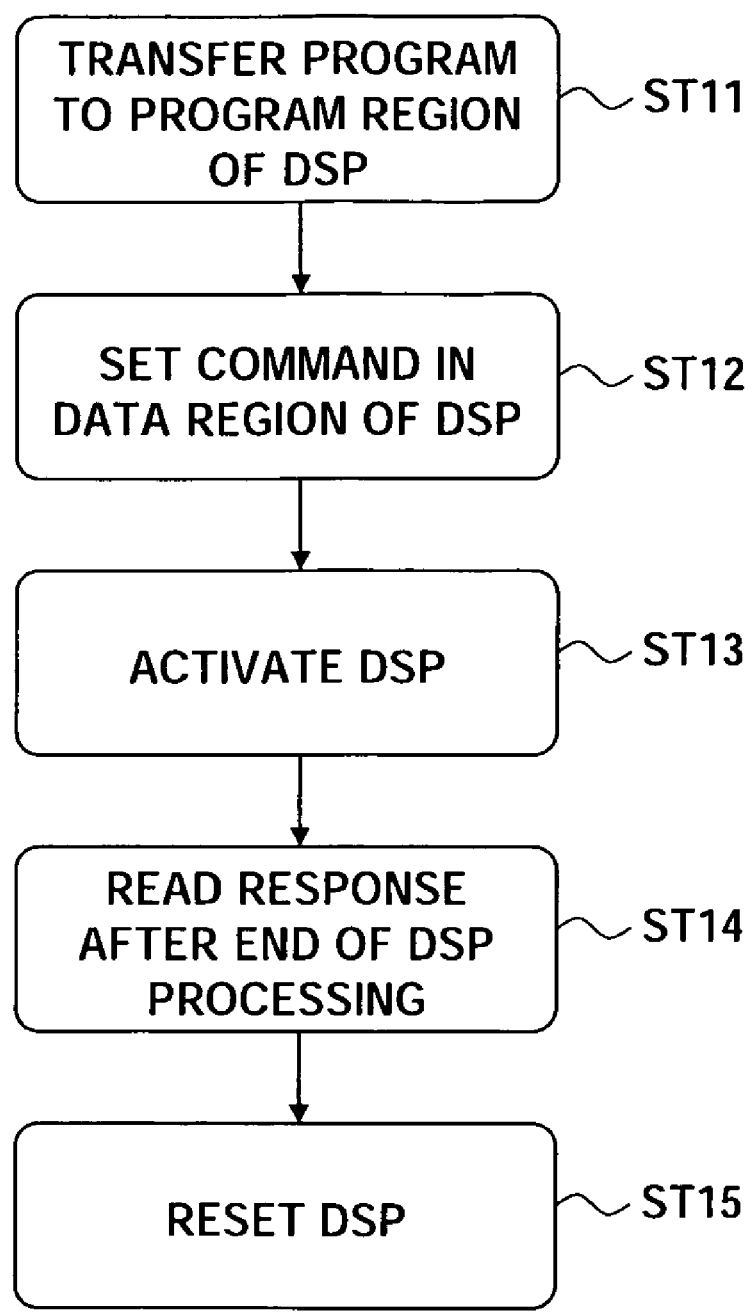
FIG. 18 is a flow chart for briefly explaining the processing for the DSP of the acquisition unit of the control unit according to the present embodiment.

FIG. 18 is a flow chart for briefly explaining the processing with respect to the DSP 3253 of the acquisition unit 325 of the control unit 327.

At step ST11, the control unit 327 first selects a DSP program in accordance with the satellite for which synchronization is to be acquired and the algorithm.

At step ST12, the control unit 327 sets the required command parameters such as the number of the satellite for which synchronization is to be acquired.

At step ST13, the control unit 327 releases the reset of the DSP 3253 and activates the DSP 3253.

At step ST14, the control unit 327 reads the response after the end of the processing of the DSP 3253.

Then, the control unit 327 resets the DSP 3253.

Figure 19:
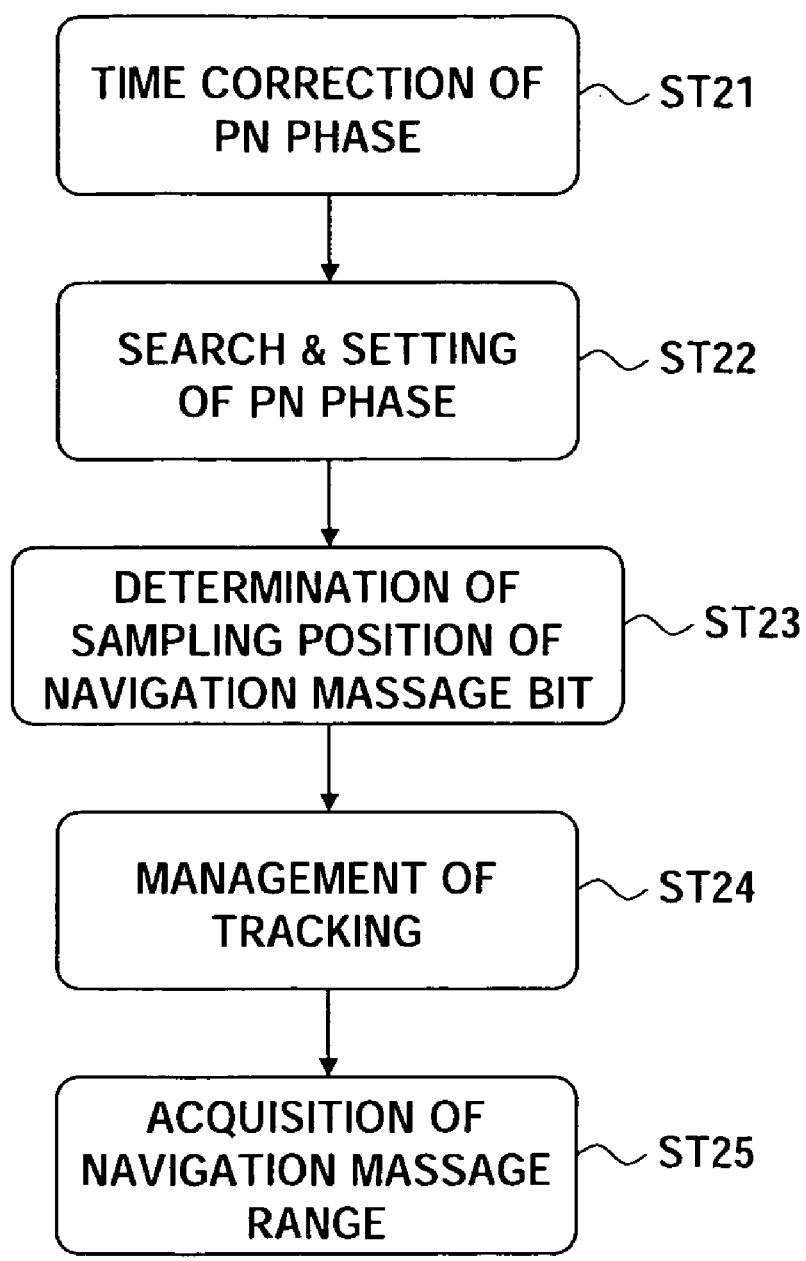
FIG. 19 is a flow chart for briefly explaining the processing for the tracking unit according to the present embodiment.

FIG. 19 is a flow chart for briefly explaining the processing with respect to the tracking unit 326 of the control unit 327.

At step ST21, the control unit 327 corrects the phase of the PN changed in the time elapsed when the DSP 3253 fetched the data.

At step ST 22, the control unit 327 detects the peak while shifting the phase of the PN within the range of about one chip.

At step ST23, the control unit 327 estimates the bit change point of the navigation message and determines the sampling timing of the navigation message.

At step ST24, the control unit 327 monitors and manages the state of the tracking.

Then, at step St25, the control unit 327 acquires the navigation message and the range data and hands it over to the position calculation routine.

Next, a brief explanation will be given of the search of the phase of the PN by the control unit 327.

Even through the phase of the PN is corrected, as shown in FIGS. 20A to 20 C, an error about ±0.5 chip is generated. For this reason, the phase of the PN is searched for in the following way.

1. The NCO 615 of the DLL 600 and the NCO 504 of the Costas loop 500 are set at values obtained at the acquisition unit 325, and the PN is reset with the phase of the PN shifted by −0.5 chip from the original phase.

At this time, the DLL 600 is turned off, and the NCO 615 of the DLL 600 and the NCO 504 of the Costas loop 500 are not updated.

2. It is confirmed at that point of time if correlation can be obtained.

3. The NCO 615 of the DLL 600 is set at a value advanced by +3/18 chips in 20 ms, and the correlation after 20 ms is confirmed.

4. The process of 3. is repeated.

By the above search, when the value is higher than the predetermined threshold value, it is regarded that the correlation was detected, then the DLL 600 is turned on, and the feedback control of the NCO 615 of the DLL 600 and the NCO 504 of the Costas loop 500 is started.

Further, as the processing concerning the NCO 615 of the DLL 600, the control unit 327 calculates a mean value of the NCO and sets the NCO limiter based on that value. For example, the control unit 327 updates the mean value at every 20 ms and sets the limiter value for every second to ±8 of the mean value.

As the processing concerning the NCO 504 of the Costas loop 500, the control unit 327 calculates the mean value of the NCO and sets the NCO limiter based on that value. For example, the control unit 327 updates the mean value at every 20 ms and sets the limiter value for every second to ±25 Hz of the mean value.

Further, FIGS. 21A and 21B are views for explaining the decoding function of the navigation message (one word) of the control unit 327.

The control unit 327 decodes the navigation message as shown in FIG. 21A.

Next, the control unit 327 executes a parity check. The PE bit becomes "1" at the time of a parity error.

Further, the control unit 327 executes a preamble check. The PR becomes "1" when the parity is OK and d1 to d8 are 0×8b.

Note that when for example the preamble is found, an interruption is caused.

Next, the operation will be explained.

The baseband unit 21 of the mobile phone unit 20 engages in speech with a close base station 80 or controls the transfer of the predetermined data through the transmission and reception antenna 24 in synchronization with the reference signal from the reference frequency oscillator 23.

The baseband unit 21 changes the oscillation frequency of the reference frequency oscillator 23 according to the established protocols when the base station 80 of the other party in communication changes by generating a frequency change signal S21 for reporting that the base station has changed and the frequency is to be changed and outputting it to the D/A converter 22.

The D/A converter 22 converts the digital frequency change signal S21 from the baseband unit 21 to an analog signal and outputs it to the reference frequency oscillator 23.

Then, he reference frequency oscillator 23 changes the oscillation frequency by exactly Δf (for example 0.7 Hz) according to the frequency change instruction of the analog frequency change signal S21 from the D/A converter 22 and supplies the reference signal Fox of the frequency f+Δf after change to the baseband unit 21.

Further, the electric power is supplied to the GPS receiver 30 and the crystal oscillator 40 by the control of the electric power source control unit 70, the host CPU 50 extracts the error value from the reference oscillation frequency of the crystal oscillator 40 obtained in the previous positioning from the storage unit 60, the frequency error of the crystal oscillator 40 is transmitted to the GPS receiver 30, and written to the memory unit 324 via the control unit 327 in the GPS receiver 30.

Afterward, the GPS satellite is searched by the GPS receiver 30, and the position-finding result is obtained.

Here, for example, the control unit 327 of the GPS baseband unit 32 determines the satellite for which synchronization is to be acquired and the algorithm in accordance with the initial state of a cold start, a warm start, or a hot start, controls the on/off state of the GPS front end unit, adjusts the gain, and so on.

The GPS front end unit 31 receives the radio RF signal from the GPS satellite having a frequency of 1575.42 MHz at the antenna 311.

The received RF signal is amplified at the low noise amplifier 312, stripped of any signals out of the GPS signal band at the BPF 313 serving as the SAW filter, and input via the amplifier 314 to the mixer 316.

Then, the mixer 316 mixes it with the oscillation signal S315 from the frequency synthesizer 315. Further, an IF signal S318 having a frequency of 1.023 MHz is extracted through the amplifier 317 and the LPF 318.

The IF signal S318 is converted to a digital signal at the analog/digital circuit 319 and output as one-bit serial signal IF signal S319 to the GPS baseband unit 32.

The GPS baseband unit 32 receives the IF signal S319 from the GPS front end unit 31, performs acquisition for finding the synchronization point initially or when the system largely deviates from the synchronized state, controls the delay difference to be sufficiently smaller in value than one chip length of the spread code after the acquisition, and performs tracking for establishing synchronization of the C/A code and carrier.

The control unit 327 performs the processing of the positioning computation, the position search and so on based on the range data, the Doppler shift, the navigation message, the time obtained by the above tracking processing.

The control unit 327 stores the frequency error value of the crystal oscillator 40 obtained at the positioning computation in the memory unit 324.

Then, the host CPU 50 obtains the error value of the reference frequency of the crystal oscillator obtained at the positioning computation by making the memory unit 324 to access the control unit of the baseband unit 32 and stores the obtained frequency error value of the crystal oscillator 40 to the storage unit 60.

Then, the control of the power source control unit 70 disconnects the supply of electric power to the front end unit 31, the baseband unit 32 of the GPS receiver 30 and the crystal oscillator 40.

As mentioned above, according to the present embodiment, the host CPU 50 obtains the error value of the reference oscillation frequency of the crystal oscillator 40 from the memory unit of the baseband unit 324, stores in the storage unit 60, corrects the reference frequency by transmitting this value to the GPS receiver at the next positioning computation, and makes to search the GPS satellite, therefore the electric power need not to be supplied to the GPS receiver 30 and the crystal oscillator 40, and the position-finding result can be obtained at the high speed with reducing the electric power consumption.

While the invention has been described with reference to specific embodiment chosen for purpose of illustration, it should be apparent that numerous modifications could be made thereto by those skilled in the art without departing from the basic concept and scope of the invention.

What is claimed is:

1. A communication device for demodulating a received signal by a spread code, comprising:
    an oscillator generating an oscillation signal of a reference frequency;
    a receiver using a signal having the reference frequency oscillated by said oscillator;
    a first storage unit being able to store a frequency error value obtained from said receiver; and
    a host circuit storing the frequency error value obtained from said receiver in said first storage unit and transmitting the frequency error value stored in said first storage unit to said receiver,
    wherein said receiver comprises:
    a first means for converting the received signal to an intermediate frequency signal based on the oscillation signal by said oscillator;
    a second means for calculating positioning by receiving said intermediate frequency signal and obtaining the frequency error of said oscillation signal;
    a second storage unit able to store the frequency error value obtained at said positioning computation; and
    a third means for performing a search for a satellite signal based on said frequency error value stored in said second storage unit,
        wherein said second storage unit can read and write said frequency error value from said host circuit.

2. A communication device as set forth in claim 1, wherein said host circuit reads out the error value of the reference frequency of said oscillator obtained when said receiver calculated the positioning from the second storage unit of said receiver, and stores that in said first storage unit, and
    transmits the error value from said first storage unit to said second storage unit of said receiver when the present position is needed next.

3. A communication device as set forth in claim 1, comprising an electric power source control unit controlling the supply of electric power to said receiver and said oscillator,
    wherein said electric power source control unit supplies the electric power to said receiver and said oscillator when the present position is needed, and
    transmits the error value from said first storage unit to said second storage unit of said receiver when the present position is needed next.

4. A communication device as set forth in claim 2, comprising an electric power source control unit controlling the supply of electric power to said receiver and said oscillator,
    wherein said electric power source control unit supplies the electric power to said receiver and said oscillator when the present position is needed, and
    transmits the error value from said first storage unit to said second storage unit of said receiver when present position is needed next.

5. A communication device comprising:
    a first communication portion including a first oscillator outputting a reference signal of which oscillation frequency changes by a predetermined frequency in accordance with the communication condition; and
    a second communication portion demodulating the received signal by a spread code;
    wherein said second communication portion comprises:
    a second oscillator generating an oscillation signal of a reference frequency; and
    a receiver using a signal having the reference frequency oscillated by said second oscillator;
    wherein said receiver comprises:
    a first means for converting the received signal to an intermediate frequency signal based on the oscillation signal by said second oscillator;
    a second means for calculating the positioning by receiving said intermediate frequency signal and obtaining the frequency error of said oscillation signal;
    a storage unit able to store the frequency error value obtained at said positioning computation; and
    a third means for performing a search for a satellite signal based on said frequency error value stored in said storage unit;
        wherein said storage unit can read and write said frequency error value from the external.

6. A communication device comprising:
    a first communication portion including a first oscillator outputting a reference signal of which oscillation frequency changes by a predetermined frequency in accordance with the communication condition; and
    a second communication portion demodulating a received signal by a spread code;
    wherein said second communication portion comprises:
    a second oscillator generating an oscillation signal of a reference frequency;
    a receiver using a signal having the reference frequency oscillated by said second oscillator;
    a first storage unit able to store a frequency error value obtained from said receiver; and
    a host circuit storing the frequency error value obtained from said receiver in said first storage unit and transmitting the frequency error value stored in said first storage unit to said receiver,
    wherein said receiver comprises:
    a first means for converting the received signal to an intermediate frequency signal based on the oscillation signal by said second oscillator;
    a second means for calculating positioning by receiving said intermediate frequency signal and obtaining frequency error of said oscillation signal;

a second storage unit able to store the frequency error value obtained at said positioning computation; and a third means for performing a search for a satellite signal based on said frequency error value stored in said second storage unit;

wherein said second storage unit can read and write said frequency error value from said host circuit.

7. A communication device as set forth in claim 6, comprising an electric power source control unit controlling the supply of electric power to said receiver and said oscillator, wherein said electric power source control unit supplies the electric power to said receiver and said oscillator when the present position is needed, and transmits the error value from said first storage unit to the second storage unit of said receiver when the present position is needed next.

* * * * *